United States Patent
Ney

[11] 3,853,658
[45] Dec. 10, 1974

[54] FIBER OPTICAL IMAGE MAGNIFIER PANEL AND METHOD OF MANUFACTURE

[76] Inventor: Robert Johan Ney, 484 Braves Trail Ln., Media, Pa. 19063

[22] Filed: Apr. 19, 1973

[21] Appl. No.: 352,406

Related U.S. Application Data

[63] Continuation-in-part of Ser. No. 161,765, July 12, 1971, abandoned.

[52] U.S. Cl............ 156/180, 65/DIG. 7, 156/245, 156/250, 156/290, 156/296, 350/96 B, 350/320
[51] Int. Cl. ............................................. G02b 5/16
[58] Field of Search .......... 156/166, 180, 245, 250, 156/290, 296; 65/4, DIG. 7; 29/527.5, 527.6, 419, 472.9; 350/96 B, 320

[56] References Cited
UNITED STATES PATENTS

| | | | |
|---|---|---|---|
| 3,010,357 | 11/1961 | Hirschowitz | 65/DIG. 7 |
| 3,019,515 | 2/1962 | Whitehurst et al. | 29/195 |
| 3,043,910 | 7/1962 | Hicks | 65/DIG. 7 |
| 3,141,106 | 7/1964 | Kapany | 313/92 |
| 3,193,363 | 7/1965 | Hicks et al. | 156/296 |
| 3,333,278 | 7/1967 | Hawkins et al. | 156/296 |
| 3,542,451 | 11/1970 | Washburn | 350/96 |
| 3,556,635 | 1/1971 | Schrenk et al. | 350/96 |
| 3,669,639 | 6/1972 | Inoue et al. | 65/4 |

OTHER PUBLICATIONS

Davidson, "Space Redistribution of Optical Image with Light Conducting Fiber Bundle for Color TV Pickup Tube," RCA.

*Primary Examiner*—Daniel J. Fritsch

[57] ABSTRACT

This invention relates to fiber optical image transfer and magnifier devices and their method of manufacture. More specifically the magnifier device is of the spaced fiber array type with constant light conducting fiber cross section. The fiber endings on the magnifier screen are spaced by an interstitial metal matrix which is formed by a casting process. The casting mould is made of an aperture plate on the bottom, and it is enclosed by side walls. The fibers are threaded thru the aperture plate holes and are hence located and held in position for casting. Fibers are fed through the aperture plate from spools. The casting is pulled out of the mould, with its fibers attached to it, to the desired length, then another casting is made. The input screen is produced by the use of movable fiber guides and a compression die.

7 Claims, 4 Drawing Figures

PATENTED DEC 10 1974

3,853,658

FIBER OPTICAL IMAGE MAGNIFIER PANEL AND METHOD OF MANUFACTURE

This application FIBER OPTICAL IMAGE MAGNIFIER PANEL and METHOD of MANUFACTURE is a continuing in part application of Serial No. 161,765 filed on July 12, 1971 1971, now abandoned.

BRIEF SUMMARY

The subject image transfer and magnifier device consists of two opposing coherent or corresponding array of fiber endings, connected by fibers of constant cross section, where on one end the fiber endings are in close proximity while on the other end the fiber endings are separated by an interstitial cast matrix.

It is well-known to those skilled in the art, that various plastics may be cast and hardened in order to hold groups of fiber bundles in desired positions. This invention spaces a multitude of individual fiber endings in an orderly spaced array, with the use of a cast metal matrix and maintains coherence with the opposing fiber endings! The center to center fiber spacing is larger than the fiber diameter, for the purpose of producing a magnified image by said fiber endings, when cooperating with an opposing array of fiber endings closely packed.

In order to form a functional matrix spaced fiber optical array a number of conditions must be met. First of all the process must be continuous so that no re-threading of the equipment should be necessary, since we are dealing with thousands of fibers. This continuous process is accomplished by pulling the casting and the bundle of fibers out of the mould intact, and feeding continuous strands of fibers from spools through each of the aperture holes. The Wood's Metal or other heavy metal alloys are ideally suited for this requirement since they have relatively high surface tension properties, and hence they generally form a meniscus away from contacting walls. Such liquid does not enter the clearance space between the fiber and the aperture wall. Liquid plastics or polymers possess low surface tension properties hence, they generally form a meniscus toward the contacting wall. Low liquid surface tension is conducive to the so-called capillary action which phenomenon will fill the fiber to aperture wall clearance space with the liquid. Under these conditions it is substantially impossible to pull the solidified casting out of the mould with the fibers unbroken, except for relatively large diameter (0.010 inch+) fibers. For close viewing purposes, and for moderate conduit diameters with large number of elements, however, 0.0005 inch to 0.002 inch diameter fibers are necessary. Typically, a standard endoscope picture is obtained with about 20,000 fibers, with 0.001 inch fibers the conduit diameter is about 0.22 inches. The fibers spaced at 0.012 inches apart on the output screen will give a magnification of about 13X, and a critical viewing distance of 3 feet. Critical viewing distance is defined as the distance from the screen at which the discontinuous image becomes continuous as the viewing distance is increased.

Another condition that must be met in order to obtain functional output screen mosaics or elements; the fiber distribution must be quite uniform. The human eye is capable of detecting a few percent variation in uniformity of the illumination. The holes in the aperture plate are able to locate the fibers within a few percent of the perfect spacing. A further requirement is to fill all of the space between the fibers and the mould walls by the interstitial matrix forming liquid. It is essential hence to develop a well-controlled pressure at the aperture plate. It is not practical to seal the top of the mould, where the fiber bundle exits the mould, hence pressure can not be applied by piston type devices. The Wood's metal or Cerrobend alloy used in this invention is ideally suited since it has a very high density, so that adequate static pressure may be developed by thin layers of the liquid. It was found that ¼ inch layer of Wood's metal develops a continuous cast matrix with 0.003 inch fibers at a center to center spacing of 0.025 inch. Yet another requirement is to maintain the maximum casting temperature of the alloy below the softening point of the fiber. The temperature at which synthetic or "plastic" optical fibers get damaged is over about 180° to 200° F. Good pouring characteristics were noted for Wood's Metal and Cerrobend alloy at 170 °F. No damage could be observed on fibers as a result of casting at this temperature. A further requirement is to captivate the fibers securely in the interstitial matrix. The subject metal alloys exhibit a minute linear expansion after solidification. Thus the metal "locks" onto the fibers.

Still another requirement is to be able to polish the composite metal fiber matrix. The relative hardness of the materials plays an important role in being able to polish them simultaneously. Synthetic fibers and Wood's Metal has similar polishing characteristics, hence high quality optical surfaces are obtained at the fiber endings.

Another requirement on the matrix forming material is to harden fast, since the equipment is expensive and hence it must produce at a relatively high rate, in order to be economically feasible. A Wood's Metal matrix of 1 inch × 1 inch × ¼ inch when cast at about 170°F will solidify in less than 2 minutes when a 5 cubic feet per minute air blower is directed on the top of the casting. A comparable epoxy matrix would take hours to solidify.

The synthetic fiber has a great advantage over glass fibers due to its ability to take small radius bends without fracturing. Of course the tensile strength of the glass fiber is considerably higher than that of the synthetic fiber. The most critical region for bending or flexural breakage occurs at the entrance region of the fibers into the solid matrix. It is extremely hard to keep glass fibers from breaking at this region during fabrication, while no fiber breakage was ever observed in this region with synthetic fibers. A further advantage of the Bismuth, Lead, Tin, Cadmium based fusible alloy of the Wood's Metal type is its relatively low cost compared to the Gallium or Indium based low melting point alloys.

The complete process requires the insertion of movable guides into intersecting rows of fibers, in order to maintain coherence at the compression process of the small screen end of the image conduit. Accordingly a rectangular array of holes is provided at the casting mould, where the rows are perpendicular to each other. Hexagonal array may be provided also where the rows form angles of 60° and 120° respectively. Wires of 0.0005 to 0.001 inch diameter are used for the guides.

Another aspect of the fabrication of the Image Magnifier Panel which must be considered is the size of the equipment and the number of fibers it handles simultaneously. The major problem with the process is fiber breakage, particularly with fiber diameters at about 0.002 inches and under. Broken fibers are easier to rethread in the smaller machines. Moreover, considerable effort goes into initially loading and threading fibers into the machine. It is hence expedient to make the panels in sections or mosaics with a relatively small number of fibers, then joining said mosaics. It was found in practice that 1,600 to 3,600 fibers may be handled in a machine with relative ease. In order to produce pictures with information quality equal to a home color television screen, for a stationary image, about 100,000 fibers are required. In addition, the coherence or correspondence of the output screen fiber endings to the input screen fiber endings must be better than 90% of the theoretically perfect coherence. For a moving image the apparent number of picture elements will increase to about 220,000. Conversely, in order to obtain the information quality of a single frame 35 mm color film, about 1,000,000 fibers are required for a stationary image. It is desirable of course to join or mate the edges of individual mosaic sub-panels, so that the joint is not visible, i.e., the picture is continuous at the joint. This is not a serious problem at the input screen, where standard state of the art fiber optical mosaic joining methods are available. On the output screen however, special techniques are required, due to the spacing of the fiber endings. The "invisible" joining is accomplished by spacing the fiber endings at the edge rows, from the mosaic edge by one-half the normal fiber center to center spacing. In this manner, when the mosaic matrix edges are mated together, the adjacent fiber centers across the joint are spaced at the normal fiber center to center spacing. The rectangular fiber array is ideally suited for this joining method, since the mosaic matrix edge is straight. For a hexagonal array, the mosaic matrix edge would have to be "zig-zagged" in order to maintain the one-half pitch distance from the respective edges. This would be quite cumbersome to produce.

In order to further increase the magnification factor of the device, it was found that the input screen may be reduced in size by a tapered compression die. No significant loss of efficiency was noted when 0.003 inch diameter fiber endings were reduced to 0.0005 inch flat to flat hexagonal structure, with a 20° total fiber axial taper angle. This input screen with fiber center to center spacing of 0.0005 inches, in cooperation with an output screen of 0.025 inch fiber spacing gives an overall magnification of 50X. The above optics is well suited for obtaining screen microscopes, due to its inherently high optical efficiency, compared to other types of projection screen devices. The mating of the 50X magnifier panel with a 100X objective will result in an overall magnification of 5,000X.

The principal object of this invention is to provide a practical method and equipment to produce fiber optical image magnifier panels of the constant fiber cross section type, where on the output side the fibers are separated by a matrix and on the input side the fibers are closely packed.

Another object is to provide individual magnifier elements or mosaics which may be joined together to form one larger unitized magnifier panel of any size and shape deemed necessary.

A further object is to provide a fiber optical magnifier panel, and a method of manufacture, which is relatively thin compared to its picture diagonal dimension.

Yet another object is to provide practical production equipment to produce a wide range of fiber optical Image Magnifier Panels, with fiber diameters ranging from less than 0.0005 inches to over 0.040 inches, and fiber end spacings of 0.005 inches to over 0.4 inches respectively.

Still another object is to provide a direct view screen for flexible fiber Image Conduits, and its method of manufacture.

Another object is to provide a continuous economical process for assembling thousands of fibers simultaneously into a coherent magnifier device.

Another object is to obtain Image Magnifier Panels with magnification factors higher than that obtainable with close packing moderate size input screen fibers, by compressing the input screen fibers in a tapered die.

Another object is to provide a high optical efficiency and extremely compact "back" projection device for photographic film reading, and its method of manufacture. Other objects and advantages of the invention will become readily apparent from the following description when taken in conjunction with the accompanying drawings in which.

Figure 1:
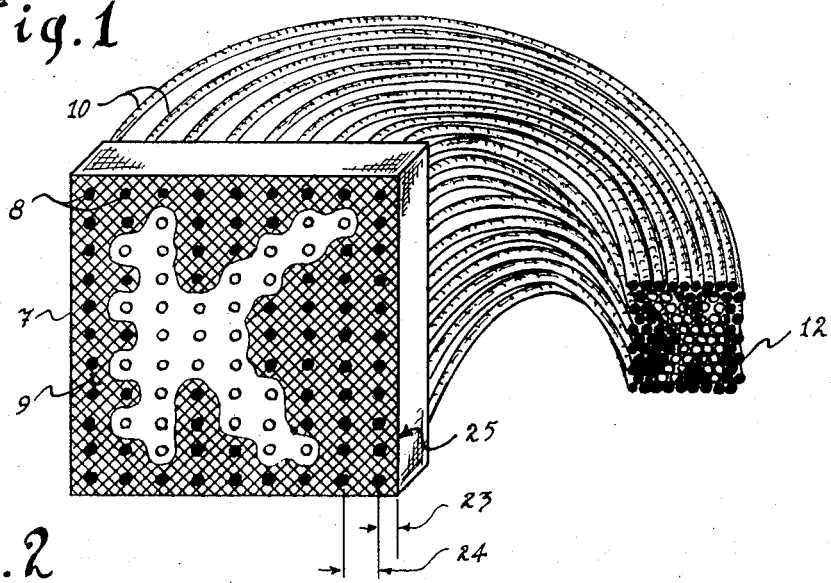
FIG. 1 is an enlarged front elevational view of the Magnifier Panel indicating both output and input screens; the output screen image is shown as it would appear beyond the critical viewing distance.
Figure 2:
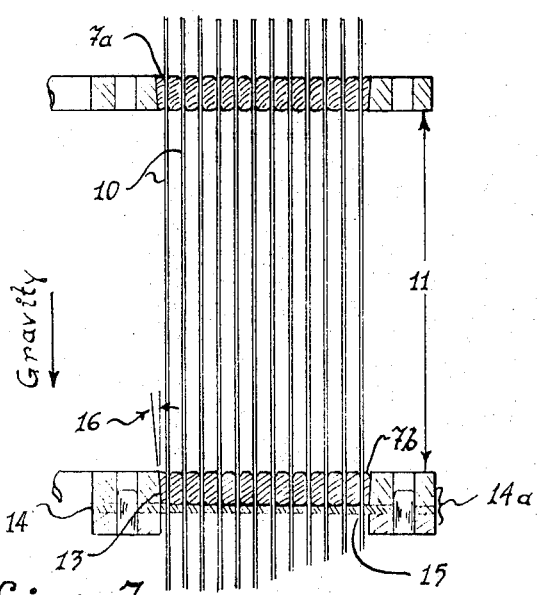
FIG. 2 is an enlarged sectional elevation view of the casting mould, with a row of fibers and two cast matrixes in position.
Figure 3:
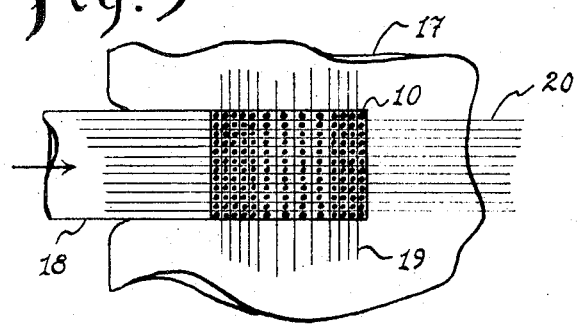
FIG. 3 is a view of the compression die with fiber guides in position for operation.

Referring to FIG. 1 the interstitial metal matrix 7 spaces and supports fiber endings 8 in horizontal and vertical rows forming a rectangular array on the output screen 9. A multitude of fibers 10 form an image conduit which connects the output screen 9 to the input screen 12. The term fiber as referred to herein is to be interpreted as light conducting members with relatively large surface area to cross sectional area ratios. Fibers of polymerized plastics or so-called synthetics are the preferred materials for the embodiment of this invention, since they may be bent several times thru an arc of about 2-3 fiber diameters without rupturing them. This is, of course not possible with glass fibers. The tensile strength of synthetic fibers is relatively low, however, typically the rupture strength in tension for 0.001 inch diameter fiber is in the range of 4 to 8 grams. It will be seen that the fabrication process was designed to accommodate this critical parameter. Once the device is placed in proper protective packaging, fiber breakage is considerably less for synthetic fibers than for glass fibers. Opposing fiber endings 8 and 12 are placed in a corresponding or so-called coherent manner on the output screen 9 and input screen 12. This is accomplished by the aperture plate 14 of the casting mould shown in FIG. 2, cooperating with the fiber guides 19 and 20 of the compression die shown in FIG. 3. The operation will be clear from subsequent description of the process. Referring to FIG. 2 fibers are fed thru the holes 15 in the aperture plate 14. The holes or apertures 15 substantially determine the location of the fiber endings 8 on the output screen. The aperture diameter should be just large enough to clear the largest positive tolerance fiber, in general about 10% over nominal fiber diameter. The formation of as small a clearance gap as possible between the fiber and the aperture wall is extremely important. In repeated casting above thousands of apertures there is a tendency even for the heavy metal alloys with extremely high surface tensions to creep into some clearance spaces. If sufficient amount of casting material deposits on the aperture wall, fiber breakage will result. It was found in practice that when said clearance gap is about 0.001 in. with 0.010 in. dia. fiber, for 1 inch × 1 inch × ¼ inch casting poured at 180°F, no metal was deposited on the aperture side walls after several dozen castings. A commercial alloy called Cerrobend is the preferred material for the metal matrix 7; it is made up of 50.0% Bismuth, 26.7% Lead, 13.3% Tin and 10% Cadmium, forming a quaternary eutectic alloy. The congealing point is at about 158°F. Wood's Metal is very similar in makeup, and has a congealing point within a few degrees that of Cerrobend. The specific gravity of Cerrobend at room temperature is 9.4.

Another rare property of Cerrobend is used to great advantage in the fabrication of the magnifier output screen. This alloy grows in size after solidification; most of the growth 0.0045 inches/inch, takes place in the first 30 minutes. Within 2 minutes of solidification the growth is 0.0025 inches/inch. The thermal contraction rate of the synthetic fiber is considerably greater than that of any metal. Consequently at cooling, a gap between the fiber and the matrix would develop immediately after the solidification of the metal. This was indeed noted when pure Indium was used for the metal matrix 7 formation. The fibers could be easily pulled out of castings one-fourth inch thick, during handling. When the matrix 7 thickness was one-eighth inch or less, fibers would fall out of their holes freely. The unique growth after solidification of some Bismuth-Lead based alloys, specifically that of Cerrobend or Wood's Metal, imparts sufficient reduction of the hole size in the metal so that the fiber is locked into position. No degredation of optical transmission was observed in fibers thus constrained, however. The casting mould block 14a. supports the aperture plate 14, and provides the mould cavity enclosed by wall 13. The cavity wall 13 is provided with a 5° draft angle 16 in order to facilitate the removal of the cast matrix 7 from the mould. After the first casting 7a. is poured and solidified the casting 7a is pulled along the fiber axis or vertically up to the upper position. The fibers 10 are attached to the cast matrix 7a and are pulled thru the aperture plate holes 15 to the desired image conduit length 11. Fibers 10 are fed from "infinite" spools. The second matrix 7b is then poured and cooled. Fiber guides 19 and 20 are now inserted between intersecting rows of fibers.

It was found in practice that hard drawn tungsten or high carbon steel wire gives satisfactory results when used for the fiber guide wires. The wire diameter should be about one-half of the fiber diameter or less, in order that the fibers are so close that they may not slip by each other in a region within a few wire diameters outside the guides in the compression die, near the completion of the die compression cycle. A high degree of coherence may thus be maintained. After the guides are inserted into the space between fiber rows, they are held taut by spring loading. Compression die 17 is placed around the fiber bundle directly above the guides 19 and 20. Compression die plunger 18 is then pushed into the desired position with the use of a mechanical drive device to obtain a close packed fiber configuration 12. Fibers 10 are cut between the second casting 7b and the compression die 17 and 18 and the magnifier panel mosaic 7 and its conduit is removed. This process is then repeated as long as fiber 10 is available from the spools. When broken fibers exceed the tolerable levels, the borken ones may be re-threaded into the aperture plate. Once the compression of the input screen 12 is accomplished, the fiber guides 19 and 20 are removed. The fiber screen 12 is now bonded by the conventional epoxy bonding process. Conventional optical grinding and polishing of the output screen 9 and input screen 12 follows.

Figure 4:
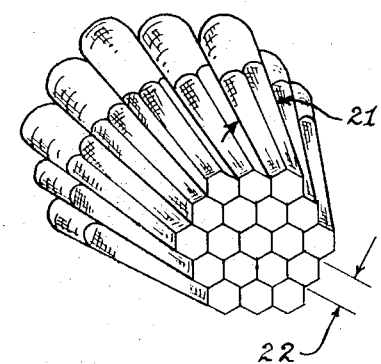
FIG. 4 is an enlarged front elevational view of an input screen with fibers reduced in size by tapering.

In order to increase the magnification factor of subject image magnifier device shown on FIG. 1 and use a moderate 0.003 to 0.010 inch diameter easily "workable" fiber, the input screen 12 fibers may be compressed. The enlarged section of a compressed fiber array is shown on FIG. 4. The compression may be accomplished by stages in sets of pyramidal cavity compression dies. Under these conditions the fiber endings become hexagonal. It was found that when the taper angle 21 was held to 20°, high light transfer efficiency was maintained with 0.003 inch diameter polymethyl methacrylate fibers compressed to 0.0005 inch flat to flat spacing 22. More repeatable results were obtained when the dies and the fibers were maintained at 200°F. during compression.

Finally to produce large screens with tens of thousands or millions of fibers, the individual mosaics must be mated together on the output screen 9 and on the input screen 12 respectively. At the output screen 9 the mosaics are bonded in side by side relationship to an optical plate. Clear epoxy resin placed directly on the output screen surface 9 and pressed against the optical plate gives the desired results; after the epoxy is hardened the multitude of input screens 12 are then placed coherently with the multitude of output screens 9 and clamped together by suitable form fitted jaws. Conventional optical grinding and polishing of the multimosaic structure follows. Great care must be taken in obtaining the input and output mosaic dimensions within relatively close tolerances. In general, satisfactory mating is obtained when the mosaics are accurate to ½% of nominal linear dimensions. Otherwise the well-known "chicken wire" pattern may show up in the image. The edge fiber to matrix edge spacing 23 is made one half the normal center to center spacing 24. When two mosaic edges 25 with this geometry are placed in close proximity, fiber center to center spacing across the mating edges 25 will be equal to one normal center to center spacing. Great care must be taken again to obtain close mating between matrix edges 25. For an "invisible" joint the total deviation of the fiber spacing across the mating edges 25 should vary no more than 10% from the normal spacing.

It will be appreciated by those skilled in the art, that the invention may be carried out in various ways and may take various forms and embodiments other than those illustrative embodiments heretofore described. Accordingly, it is to be understood that the scope of the invention is not limited by the details of the foregoing description, and I intend by the following claims to cover all modifications within the spirit and scope of my invention.

What I claim to be new and desire to secure by letters patent of the United States is:

1. A method of fabricating a fiber optical image transfer and magnifier device comprising: threading a plurality of light conducting fibers through an orderly array of holes in an aperture plate forming the bottom of a mould cavity; casting an interstitial matrix by pouring a liquid matrix material into said cavity and solidifying the liquid; removing said matrix from the mould while maintaining the plurality of attached fibers intact and lifting the matrix to a position to obtain a desired fiber length while feeding the plurality of fibers through the holes of the aperture plate; casting a second metal matrix in the mould cavity while the plurality of fibers are located in the array of holes of the aperture plate and affixed to the previous casting; inserting movable fiber guides into the spaces between adjacent rows of optical fibers, two intersecting sets of said guides being inserted between fiber rows at a position located between said castings; placing compression die jaws around the plurality of fibers between the fiber guides and the previous casting in close proximity to the fiber guides; compressing the plurality of fibers in the die jaws to a close packed configuration; cutting the plurality of fibers near the guides; placing and setting a binder on the close packed fiber configuration and then grinding and polishing both fiber end surface arrays.

2. The invention as specified in claim 1, wherein the fiber used is made of a polymer.

3. The invention as specified in claim 1, wherein the fiber used is made of a polymer and the matrix forming liquid is a metal alloy.

4. The invention as specified in claim 1, wherein the fiber used is made of a polymer and the matrix forming liquid is a metalurgically expanding metal alloy.

5. The invention as specified in claim 1, wherein the fiber used is made of a polymer and the matrix forming liquid is made of 50.0% Bismuth, 26.7% Lead, 13.3% Tin, and 10.0% cadmium.

6. The invention as specified in claim 1, wherein a plurality of both fiber end surface arrays are assembled together coherently in close proximity respectively in order to form larger continuous surface arrays by placing the fiber endings in a rectangular array and spacing the fiber endings at the matrix edge rows by one-half of the normal fiber center to center spacing.

7. The invention as specified in claim 1, wherein the fiber end array containing the close packed fibers is further reduced in size by compressing said array in a die in order to reduce fiber center to center spacing and hence increase the overall magnification of the image magnifier device.

* * * * *